United States Patent [19]
Anderson

[11] 3,755,724
[45] Aug. 28, 1973

[54] CONTROL FOR SERIES SHUNT MOTOR

[75] Inventor: Albert W. Anderson, Roanoke, Va.,

[73] Assignee: General Electric Company, Salem, Va.

[22] Filed: Apr. 3, 1972

[21] Appl. No.: 240,707

[52] U.S. Cl. ............................ 318/139, 318/247
[51] Int. Cl. .............................. H02p 7/12
[58] Field of Search .............. 318/139, 246–252, 318/331, 351, 430, 474

[56] References Cited
UNITED STATES PATENTS

| | | | |
|---|---|---|---|
| 3,278,820 | 10/1966 | Cook | 318/247 X |
| 3,349,309 | 10/1967 | Dannettell | 318/139 X |
| 3,223,909 | 12/1965 | Sensing et al. | 318/139 |
| 2,902,635 | 9/1959 | Kuka | 318/250 X |

*Primary Examiner*—Bernard A. Gilheany
*Assistant Examiner*—W. E. Duncanson, Jr.
*Attorney*—Arnold E. Renner et al.

[57] ABSTRACT

A control circuit for a direct current electric motor selectively operable as a series motor and as a shunt motor. The circuit includes means to switch connections of the motor armature and of the motor field to adapt such connections to assure the proper armature commutation under predetermined load conditions. Field current is varied, in the shunt mode, by comparing a voltage drop proportional to armature current against the voltage drop across a resistor.

22 Claims, 1 Drawing Figure

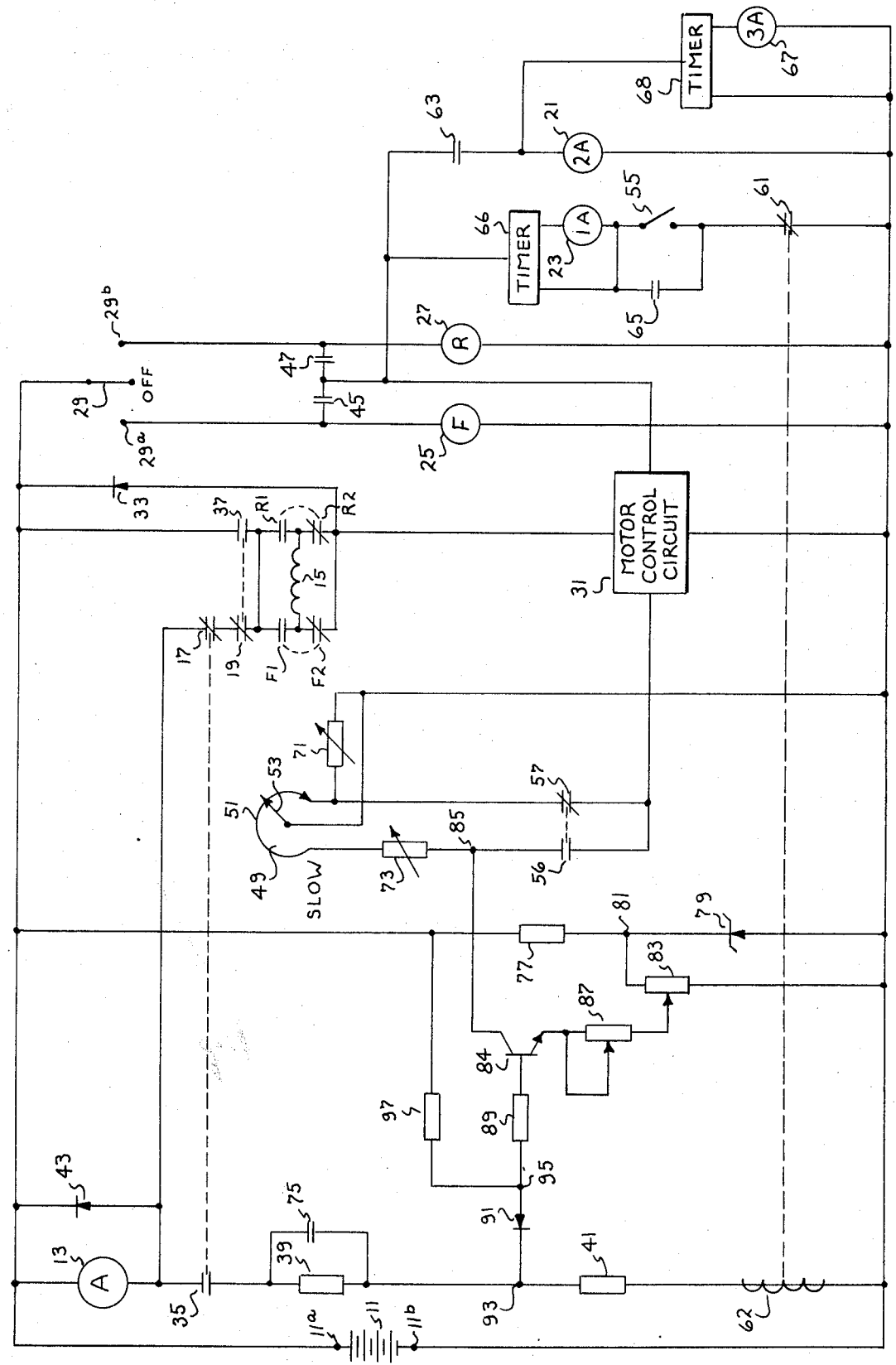

CONTROL FOR SERIES SHUNT MOTOR

BACKGROUND OF THE INVENTION

The present invention relates generally to a control circuit for switching connections between a direct current motor and a suitable source of electrical power such as a battery. The source of power will hereinafter be referred to as a battery. More particularly, the circuit relates to a control circuit for the mode of connection of the armature and the field winding of the motor to the battery. One connection is effected to provide operation of the motor in a series mode. Another connection is effected to provide operation of the motor in a shunt mode. The field strength is increased, when operating in the shunt mode, in response to a need for more torque.

The series field d-c motor has been used almost to the exclusion of every other d-c motor for applications involving heavy loading and varying torque requirements. An example of such an application, and to which the present invention is particularly applicable, is in battery powered vehicles. High maximum torque as provided by the series motor at zero speed is ideally suited for starting heavy loads, and the series motor is capable of providing torque over a wide speed range. A drooping characteristic, which causes the motor to slow down when subjected to overloads, provides a favorable power demand which does not rise in proportion to torque.

It is noteworthy that series motors are not normally well suited for uniform speeds required over a wide range of loads. Shunt motors, which change speed only slightly with load, are best suited for such applications; the maximum permissible torque, however, is considerably less than for a comparable size series motor making the shunt motor undesirable for starting heavy loads.

Compound motors have been used heretofore where it is desirable to have the features offered by both the series and the shunt motor, but the compound motor does not provide as much torque as a series motor or such uniform speed as a shunt motor. Since a compound motor includes more than one field winding, it is more expensive than a motor with a single field winding.

It is an object, therefore, of the present invention to provide means to utilize a motor with a single field winding which can combine the desirable characteristics of both the series and shunt motors.

It is another objective to provide a single pulse control which may be used to control the power ratio of on time to off time in the series mode and in the shunt mode.

A still further object is to provide a control which switches automatically to either mode of field connection in response to predetermined conditions.

SUMMARY OF THE INVENTION

The present invention achieves the desired objectives by providing a novel control circuit wherein a single field winding in a direct current motor is disposed for selective connection in either a series mode or a shunt mode. Switching means responsive to armature current increases the field strength in the shunt mode to insure proper armature commutation. The control circuit selectively effects connection of one of the two field modes as required to optimize the motor performance under varying torque requirements.

DESCRIPTION OF THE DRAWINGS

The foregoing and other objects of the present invention will become apparent as the following description proceeds and features of novelty which characterize the invention will be pointed out in particularity in the claims affixed to and forming a part of this specification. For a better understanding of this invention, reference is made to the accompanying drawing in which the single FIGURE is a schematic drawing illustrating the present invention in its preferred embodiment.

DETAILED DESCRIPTION

Referring now to the drawing, the novel features of the invention are disclosed in the illustrated power and control circuit for a direct current motor, the motor being represented by an armature 13 and a field winding 15. A suitable direct current power source, illustrated as a battery 11 with a positive terminal 11a at the top and a negative terminal 11b at the bottom, is provided to supply power to the motor. Armature 13 and field winding 15 are disposed so that selection may be made between a series field connection mode and a shunt field connection mode as described hereinafter.

Power is applied from the battery 11 to the circuit by a first switching means illustrated as a master switch 29. Master switch 29 also selectively determines the direction of current through the field winding 15, and hence the direction of torque resulting from applied power. Master switch 29, connected to battery terminal 11a, may be selectively moved from a center "Off" position to a contact 29a on the left and to a contact 29b on the right. If the switch is moved to the left, an F coil 25 is connected across battery 11; if the switch 29 is moved to the right, and R coil 27 is connected across battery 11.

A normally closed contact 17 connected at the bottom of armature 13 and a normally closed contact 19 in series with contact 17 form a part of a second switching means which selects between the series field mode and the shunt field mode. Contacts 17 and 19 are closed for the series mode and open for the shunt mode. The motor is normally started with contacts 17 and 19 closed; i.e., the motor is in the series mode. Contact 17 is operated by a 2A coil 21, and contact 19 is operated by a 1A coil 23. The operation of coils 1A and 2A is explained hereinafter.

Two pairs of contacts F1, F2 and R1, R2, connected in parallel to the free end of contact 19, also form a part of the first switching means. Contacts F1 and R1 are normally open whereas contacts F2 and R2 are normally closed. Contact F1 is connected with a series lead to contact F2, and contact R1 is connected with a series lead to R2. Electrical isolation is provided by mechanically interlocking each contact pair. Field winding 15 is connected from the lead between contacts F1, F2 to the lead between contacts R1, R2. Contacts F1, F2 change status when the F coil 25 is energized, and contacts R1, R2 change status when the R coil is energized.

If switch 29 is moved to contact 29a, the F coil 25 is energized causing contacts F1 and F2 to change status; i.e., contact F1 is closed and contact F2 is opened. Current may now flow through contact F1, through winding 15 in a left to right direction, and through contact R2. Conversely if switch 29 is moved to contact 29b, the R coil 27 is energized causing contacts R1 and R2 to change status; i.e., contact R1 is closed and contact R2 is opened. Current may now flow through contact R1, through winding 15 in a right to left direction, and through contact F2. Thus a single series power path is formed wherein current flows from battery terminal 11A through the top to bottom path in armature 13 and through winding 15 in a direction selected by the first switching means. The F and R designations indicate, respectively, the arbitrary selection of forward and reverse directions derived by the motor torque from power applied to the motor.

From contacts F2 and R2, connection is made to one side of a motor control circuit 31, the other side of which is connected to negative battery terminal 11b. Circuit 31 comprises an element of the control means provided to selectively adjust the average power supplied to the motor. The control circuit 31 is of any suitable type, for example that described in U.S. Pat. No. 3,335,351, "DC Motor Control Circuit" issued Aug. 8, 1967, to H. E. Morris (Class 318), the referenced patent being assigned to the assignee of the present invention. Another suitable control circuit is that detailed in co-pending U.S. Pat. application, Ser. No. 73,741, "Direct Current Control Circuit" filed Sept. 21, 1970, by Albert W. Anderson et al. and being assigned to the assignee of the present invention. Current will flow through the top to bottom path of armature 13 and through field winding 15 to be governed, in the type of control circuit referenced above, by the ratio of on to off time afforded by the control circuit 31. Average current level within the motor is raised by a flyback diode 33 connected with its cathode to the top of armature 13 and its anode to the control circuit 31 side of contacts F2 and R2.

The transition to shunt field mode is completed by a second part of the second switching means including normally open contacts 35 and 37 which are closed to provide two parallel shunt mode power loops from terminal 11a to terminal 11b. Connected to the bottom of armature 13 is normally open contact 35, contact 35 being interlocked with normally closed contact 17 to make certain that both contacts have an opposite status. Contact 35 is closed upon the energization of coil 2A, such energization also opening contact 17. Hence, with contact 17 open, no current can flow through the power loop of the series mode.

The free side of contact 35 is connected to a resistor 39 which serves to reduce current surge in the armature 13 during the transition from the series to the shunt field mode. To complete this first shunt mode power loop, resistor 39 is connected through a sensor, illustrated as a resistor 41, to battery terminal 11b. If the armature current increases beyond that normal for a speed condition, the voltage drop across sensor 41 will increase. A diode 43, in parallel with armature 13, is connected with its cathode to the top of armature 13 and its anode to the bottom of armature 13 to protect against armature voltage buildup when contact 35 is opened. Diode 43 also prevents excessive current in the armature 13 whereby the latter would act as a generator if the current therethrough were greater than the current through the winding 15.

A second shunt mode power loop is effected by the closure of contact 37 which is connected at the top to battery terminal 11a and at the bottom through the aforementioned directional contacts F1, F2, R1, and R2, the field winding 15, and motor control circuit 31 to battery terminal 11b. Contact 37 is interlocked with contact 19 to make certain that both contacts have an opposite status. Contact 37, operated by coil 1A, is closed upon the energization of coil 1A, such energization also opening contact 19. Hence with contact 19 open, the series circuit power loop is interrupted. The motor control circuit 31 and the directional contacts F1, F2, R1, R2 function the same in the shunt mode as they do in the series mode, but only the current flowing through the field winding 15 is governed by the ratio of on to off time of control circuit 31. Average current level through the winding 15 as provided by control circuit 31 is raised by diode 33. In the shunt mode, diode 33 is connected with its cathode to the top of contact 37 and its anode to the control circuit 31 side of contacts F2 and R2.

Motor control circuit 31 is operative only when one of a pair of normally open contacts 45 and 47 is closed. One side of contact 45 is connected to the lead to the F coil, and one side of contact 47 is connected to the lead to the R coil. Contact 45 is closed by the energization of the F coil, and contact 47 is closed by the energization of the R coil. Connection is made to the free side of contacts 45 and 47 from control circuit 31 so that circuit 31 will be activated if one of contacts 45 and 47 is closed.

Means to control the ratio of on to off time of control circuit 31 is provided by a voltage divider circuit connected between circuit 31 and negative battery terminal 11b. Included in the voltage divider circuit is a potentiometer 49 having a resistance winding 51 and a sliding contact 53. (In the case of an electric vehicle, slider contact 53 would be connected to the accelerator control; e.g., an accelerator pedal.) The resistance winding 51 is connected to control circuit 31 and the sliding contact 53 is connected at its free end to negative battery terminal 11b. A third switching means included in the voltage divider circuit provides for the selection between the connection of circuit 31 to the left end of resistance winding 51 and the connection of circuit 31 to the right end of resistance winding 51. This third switching means includes a normally open contact 56 and a normally closed contact 57, contacts 56 and 57 being mechanically interlocked and arranged in parallel to respectively connect control circuit 31 to the left end or to the right end of resistance winding 51. Such connection is dependent upon which of contacts 56 and 57 is closed. The closure status of contacts 56 and 57 is reversed when coil 2A is energized.

The motor is normally started in the series mode with contact 57 closed. The greatest voltage divider resistance in the series mode is encountered with slider 53 contacting the left end ("Slow" position) of resistance winding 51 because the voltage divider circuit path must pass through the entire winding 51. As slider 53 is moved in a clockwise direction, more and more of winding 51 is short circuited until winding 51 is completely bypassed when slider 53 is at the right end of winding 51. As the resistance in winding 51 is shorted out, the speed of the series motor will increase because circuit 31 provides for higher average power to the motor. Maximum speed is provided, in the series mode, when winding 51 is bypassed. A variable resistor 71 in parallel with potentiometer 49 is adjustable to control minimum speed.

Upon transition to the shunt mode, such transition being described hereinafter, contact 57 is opened and contact 56 is closed to thus, essentially, invert the effective resistance of the potentiometer 49 as seen by the circuit 31 and, hence, change or invert the ratio of on time to off time as provided by that circuit. That is, upon opening contact 57 and closing contact 56 the sense of the slider position effect on the circuit 31 is reversed or inverted such that if maximum power was effected by the circuit 31 in the series mode, upon transition to the shunt mode, minimum power will be effected. The greatest voltage divider resistance is encountered in the shunt mode with slider 53 contacting the right end of winding 51 because the voltage divider circuit path must pass through the entire winding 51. With a high voltage divider resistance, control circuit 31 will provide low average power through field winding 15 and the motor will operate at top speed. A variable resistor 73, connected in series between control circuit 31 and resistance winding 51, is used to adjust the total shunt mode voltage divider circuit resistance and consequently, the maximum average power through winding 15 as provided by circuit 31.

A switch 55, operated in tandem with slider 53, is closed when slider 53 is at the right end of winding 51. When switch 55 closes, it initiates conversion from a series mode to a shunt mode by means of a sequencing circuit connected from contacts 45 and 47 to negative battery terminal 11b, this sequencing circuit being in parallel with control circuit 31. In the sequencing circuit, a first leg is provided, from contacts 45 and 47, which proceeds in the order listed through a timer 66, the closed switch 55, and a normally closed overcurrent relay contact 61 to negative battery terminal 11b. The overcurrent relay is represented by contact 61 and by a current transformer winding 62 around the lead from sensor 41 to negative battery terminal 11b.

Timer 66, which has a timing cycle in the magnitude of a few seconds, includes a contact (not shown) which closes at the end of the timing cycle. When the contact in timer 66 closes, 1A coil 23 (connected from the contact in timer 66 to the top of switch 55) is energized. The energization of coil 23 opens contact 19 and closes contact 37, thus the series motor connection is interrupted and the field winding 15 is connected across the battery 11. The energization of coil 1A also closes a contact 63 within the sequencing circuit in a second leg which parallels the first leg. In this second leg, 2A coil 21 is connected between contact 63 and negative battery terminal 11b. When contact 63 closes, coil 21 is energized causing normally closed contacts 17 and 57 to open and normally open contacts 35 and 56 to close thus completing the transition from series to shunt mode. The energization of coil 21 also closes a normally open contact 65 in parallel with switch 55. When contact 65 is closed, the first leg will not be interrupted if switch 55 is opened. As stated hereinbefore, switch 55 is operated in tandem with slider 53; hence, if slider 53 is moved in counterclockwise direction, switch 55 is opened.

The sequencing circuit has a third leg which includes a timer 68 connected in parallel with 2A coil 21. This third leg is rendered effective along with the second leg when contact 63 is closed. Timer 68, which has a timing cycle in the magnitude of 1/10 of a second, includes a contact (not shown) which closes at the end of the timing cycle. When the contact in timer 68 closes, a 3A coil 67 (connected from the contact in timer 68 to negative battery terminal 11b) is energized. The energization of 3A coil 67 closes a normally open contact 75 connected in parallel with the surge reducing resistor 39. With contact 75 closed, full current may pass through armature 13.

It is well known to one skilled in the art that maximum speed occurs in a shunt motor with minimum power through the motor field. A third switching means is provided to switch from maximum power to minimum power through the field winding 15 upon the transition from the series mode to shunt mode in order that the motor may continue to accelerate to maximum speed. Contacts 56 and 57 provide this third switching means. With contact 56 closed, contact 57 open, and slider 53 at the right end of potentiometer winding 51, maximum resistance is provided in the voltage divider circuit so that the control circuit 31 will provide low average power through field winding 15. The motor speed can be reduced in the shunt mode by moving slider 53 counterclockwise, such movement decreasing the resistance in the voltage divider circuit so that the control circuit 31 will provide a higher average power through field winding 15. When slider 53 is moved in a counterclockwise direction, the tandem operated switch 55 is opened. The motor will continue to operate as a shunt motor (even though switch 55 is opened by the counter-clockwise movement of slider 53), the sequencing circuit being maintained by closed contact 65.

If the sequencing circuit is interrupted, coils 21, 23, and 25 will be deenergized so that the contacts which they control will return to their original status and the motor will again be connected in the series mode. The sequencing circuit is interrupted by opening master switch 29 or by an overcurrent in the shunt mode armature circuit, such overcurrent causing current transformer 62 to react to open contact 61 in the first leg of the sequencing circuit.

The control means of the system also comprises fourth switching means which, in the shunt mode, overrides the total resistance selected in the voltage divider circuit so that the control circuit 31 will supply field winding 15 with higher average power. In this fourth switching means, a voltage dropping resistor 77 is connected to the positive battery terminal 11a and a zener diode 79 is connected from the resistor 77 to the negative battery terminal 11b. Voltage at a junction 81, between resistor 77 and diode 79, is fixed by zener diode 79. A variable resistor 83 is connected from junction 81 to the battery terminal 11b. Variable resistor 83 is adjusted to provide a voltage drop such that an armature current above a given value in the shunt mode will reduce the resistance of the voltage divider circuit causing the control circuit 31 to supply a higher average power through the field winding 15.

The collector of a transistor 84 is connected to a junction 85 between a variable resistor 73 and contact 56. The emitter of transistor 84 is connected through a variable resistor 87 to the slider of variable resistor 83. The base of transistor 84 is connected through a current limiting resistor 89 and a diode 91 to a junction 93 between resistors 39 and 41. Voltage at a junction 95, between resistor 89 and diode 91 is, therefore, more positive than at junction 93 by the voltage drop across diode 91, the diode 91 being forward biased by a resistor 97 connected between diode 91 and battery terminal 11a. Diode 91 also serves as a thermal compensator for transistor 84 since the change in forward voltage with temperature is the same for diode 91 and transistor 84. Transistor 84 is a high gain device with the resistor 87 in the emitter leg so that the voltage at the emitter follows the voltage at junction 93. The current through transistor 84 is proportional to the difference in voltage between junction 93 and the voltage at the slider of resistor 83 and inversely proportional to the resistance of the resistor 87.

The values of resistors 83 and 87 are set such that when increased loading conditions are applied to the motor, the motor speed torque curve will stay within the commutating limits of the motor; i.e., the slower the motor goes the more the field will be increased. As the armature current increases from a normal condition as a result of some overload condition, the voltage drop across the sensor 41 increases to a point where the voltage at junction 93 is equal to the voltage across resistor 83. When this happens, current will flow from the collector to the emitter of transistor 84. This current flow is a direct function of the increase in armature current and the value of the variable resistor 87. The field strength of winding 15 is increased by circuit 31 proportional to the current which flows from the collector to the emitter of transistor 84, and the motor torque is increased to meet the load condition.

When the motor loading condition returns to normal, the voltage drop across sensor 41 decreases to a point where the voltage at junction 93 is lower than the voltage across resistor 83 and current will no longer flow from the collector to the emitter of transistor 84. When the current flow through the collector to emitter of transistor 84 ceases, circuit 31 will again provide an average power through field winding 15 which is normal for a selected motor speed.

Thus it is seen that when the motor is operating in the shunt mode and the fourth switching means is operative, any change in armature current will cause the fourth switching means to alter the average power provided by the control circuit 31 to the field winding 15 so that the motor speed torque curve is within the commutating limits of the motor.

While there has been shown and described what is at present considered to be the preferred embodiment of the invention, modifications thereto will readily occur to those skilled in the art. It is not desired, therefore, that the invention be limited to the specific circuit shown and described and it is intended to cover in the appended claims all such modifications as fall within the true spirit and scope of the invention.

What is claimed is:

1. A control circuit for interconnecting a source of electrical power with a direct current motor comprising:
   a. first switching means selectively operable for determining the direction of current through a field winding of the motor with respect to the direction of current through an armature of the motor;
   b. second switching means operable to select between a series connection mode and a shunt connection mode for the motor;
   c. control means to selectively adjust the average power supplied to said to the motor from the source in both said series mode and said shunt mode comprising means for the varying the ratio of on time to off time so that the motor and the source are connected; and
   d. means for coupling said second switching means to said control means for causing said second switching means to be operated as a function of the status of said control means.

2. The invention in accordance with claim 1 wherein said control means acts substantially at the time of transition between a series and a shunt mode of motor connection to change said ratio of on time to off time.

3. The invention in accordance with claim 2 wherein the change in said ratio is an inversion between a relatively high value and a relatively low value.

4. The invention in accordance with claim 1 further including means operable when said motor is in said shunt mode to limit the amount of armature current of said motor.

5. The invention in accordance with claim 4 wherein said last recited means limits said current by placing the motor in the series mode.

6. The invention in accordance with claim 1 wherein said control means includes manually adjustable means to vary said ratio of on time to off time.

7. The invention in accordance with claim 6 wherein said manually adjustable means is a potentiometer.

8. The invention in accordance with claim 7 wherein the effective value of the potentiometer varies, at the time of transition between a series mode and a shunt mode of motor connection, between a relatively high value and a relatively low value.

9. The invention in accordance with claim 1 wherein said control means serves to adjust the armature current and the field current in the series mode and only the field current in the shunt mode.

10. In combination with a source of electrical power and a direct current motor having an armature and a field, the motor being selectively operable in either a series mode or a shunt mode, means for governing the operation of said motor, comprising:
   a. first switching means for selecting the relative direction of current through said armature and said field for determining the direction of torque supplied by the motors;
   b. control means operable to vary the average power supplied from the source to the motor in each of said modes including means for varying the percentage of total time the source is connected to at least the field; and
   c. second switching means responsive to predetermined conditions within said control means for automatically selecting between said series mode and said shunt mode of motor operation.

11. The invention in accordance with claim 10 wherein said percentage is varied by changing the ratio of on time to off time that the source and the field are connected.

12. The invention in accordance with claim 10 wherein said second switching means is responsive to predetermined values of current through said armature.

13. The invention in accordance with claim 10 wherein said control means acts at substantially the time of transition between a series mode and a shunt mode of motor connection to automatically change said percentage of time.

14. The invention in accordance with claim 10 wherein said source of electrical power is a battery.

15. A control circuit for interconnecting a source of electrical power with a direct current motor selectively operable in a series mode and a shunt mode of operation comprising:
  a. a master switch selectively operative to connect and disconnect said source to said motor, said master switch also providing means to select the direction of current through a field winding in said motor;
  b. a plurality of contacts to provide selection between a series connection mode and a shunt connection mode of said field winding of said motor;
  c. a potentiometer to adjust the speed of the motor by controlling the ratio of on time to off time of power through said motor.
  d. a contact arrangement to selectively invert said ratio of on time to off time upon transition between said connection modes; and,
  e. a current sensing circuit responsive to current through the armature of said motor to alter the average power provided by said control means.

16. The invention according to claim 15 wherein the current sensing circuit increases the field current as a direct function of the increase in armature current.

17. A control for an electric motor powered vehicle in which said motor derives power from a direct current source comprising:
  a. a first switching means selectively operable for determining the direction of current through a field winding of said motor with respect to the direction of current through an armature of said motor whereby the direction of torque supplied by said motor may be changed;
  b. a second switching means operable to select between a series connection mode and a shunt connection mode of said motor;
  c. a control means to selectively adjust the average power supplied to said motor from said source in both said series mode and in said shunt mode comprising means for varying the percentage of time that said source and said motor are connected; and
  d. means for coupling said second switching means to said control means for causing said second switching means to operate in response to the occurrence of predetermined conditions within said control means.

18. The invention in accordance with claim 17 wherein said control means is adjusted by means of an accelerator associated with said vehicle.

19. The invention in accordance with claim 18 wherein said accelerator serves to control a potentiometer which serves to adjust said average power.

20. The invention in accordance with claim 19 wherein said control means acts at the time of transition between a series mode and a shunt mode of motor connection to change the then effective value of said potentiometer.

21. The invention in accordance with claim 20 wherein the change in the effective value of the potentiometer is between a relatively high and a relatively low value.

22. The invention in accordance with claim 17 wherein said direct current source is a battery.

* * * * *